United States Patent

[11] 3,631,723

[72] Inventors: Heinz Eberhard, Kinnelon; Anton Menzer, Teaneck, both of N.J.
[21] Appl. No.: 46,326
[22] Filed: June 15, 1970
[45] Patented: Jan. 4, 1972
[73] Assignee: Springfield Instrument Company, Inc., Hackensack, N.J.

[54] PRESSURE-RESPONSIVE INSTRUMENT
4 Claims, 12 Drawing Figs.

[52] U.S. Cl. ................................................ 73/410, 73/387, 73/393
[51] Int. Cl. ................................................ G01l 7/14, G01l 19/04
[50] Field of Search ................................................ 73/393, 384, 386, 410

[56] References Cited
UNITED STATES PATENTS
| | | | |
|---|---|---|---|
| 3,397,578 | 8/1968 | Klumb | 73/386 |
| 459,977 | 9/1891 | Moller | 73/386 |
| 2,367,034 | 1/1945 | McCabe | 73/386 |
| 2,301,879 | 11/1942 | Jenny | 73/393 |

Primary Examiner—Louis R. Prince
Assistant Examiner—Daniel M. Yasich
Attorney—Amster & Rothstein ABSTRACT: A motion-transmitting and amplifying mechanism for a pressure-responsive instrument, such as an aneroid barometer, which includes a readily calibrated capsule coupled by a motion-amplifying leverage system to an indicator which includes a pointer journaled to move about a calibrated dial plate.

INVENTORS
HEINZ EBERHARD
ANTON MENZER
BY Amster & Rothstein
ATTORNEYS

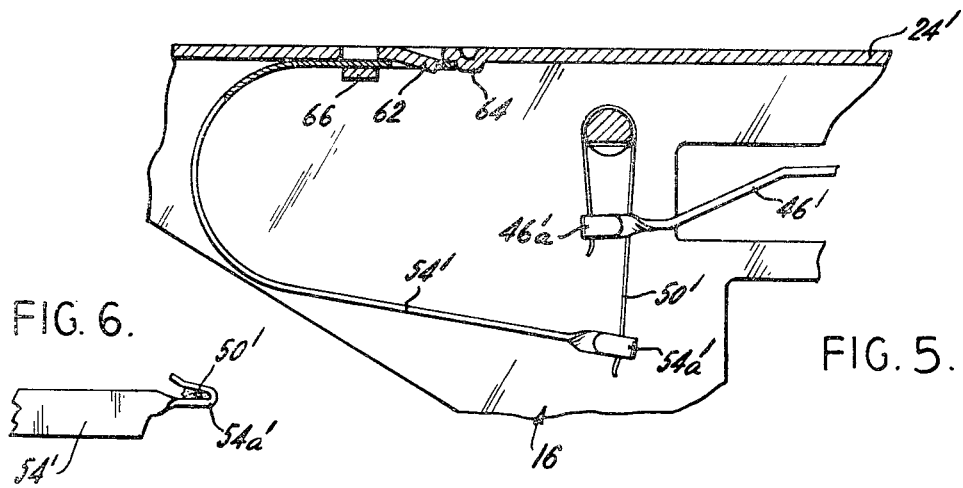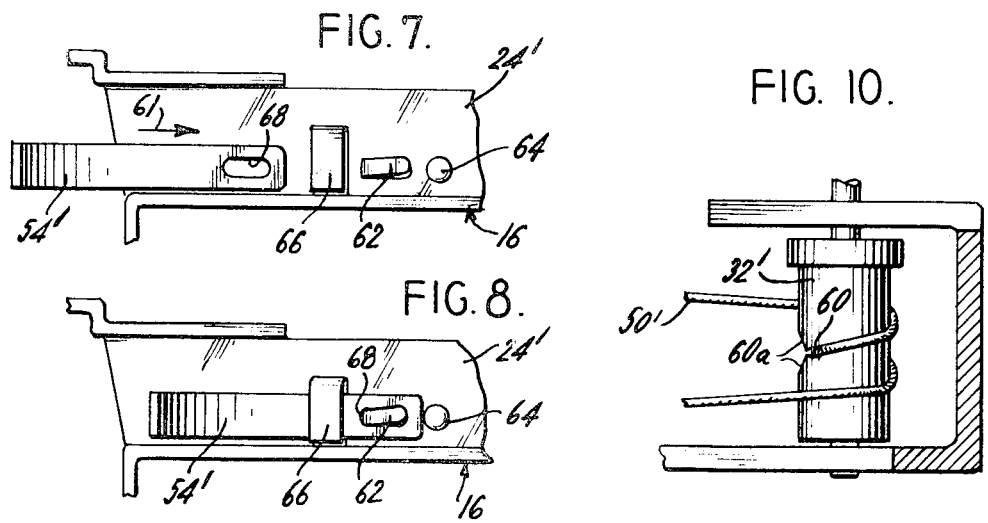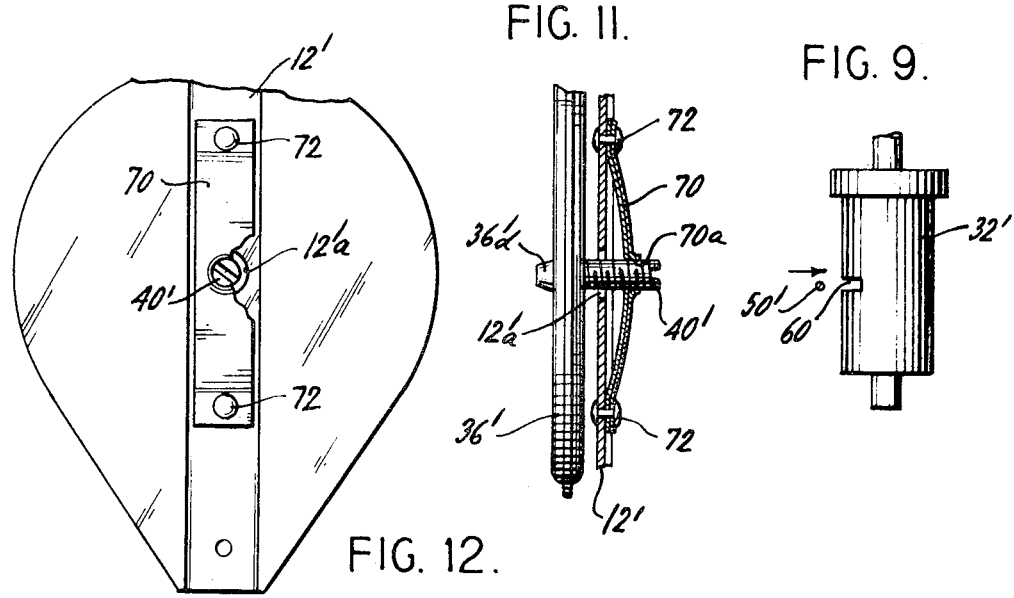

PRESSURE-RESPONSIVE INSTRUMENT

The present invention relates generally to pressure-responsive instruments and, in particular, to an improved and simplified instrument movement finding useful application in indicating, recording, and signalling apparatus, such as barometers and altimeters.

In a typical instrument movement for an aneroid barometer or the like, there is provided a capsule which is pressure-responsive and is coupled through a motion-amplifying system to an indicator, usually a rotatable pointer moving over an appropriately calibrated dial face. Throughout the years, various instrument mechanisms of this general type have been suggested, but there is ever present the need for further simplification of such mechanisms to provide low-cost instrument motions which are capable of manufacture on a mass production basis and at relatively low-unit cost.

Accordingly, it is an object of the present invention to provide an improved and simplified motion-amplifying and transmitting mechanism for an instrument movement, such as an aneroid barometer. Specifically, it is within the contemplation of the present invention to provide an instrument movement for a barometer which is of simplified construction, easily calibrated and capable of manufacture on a mass production basis at relatively low-unit cost.

In accordance with an illustrative embodiment demonstrating objects and features of the present invention, there is provided a pressure-responsive instrument which comprises a baseplate and a capsule having a wall portion movable in response to changes in fluid pressure therein. The capsule is mounted on the base plate for adjustment and calibration by a depending threaded stud which is operatively connected to the capsule and received within a tapped hole on the base plate. A frame is mounted on the baseplate and serves to mount the motion-amplifying and transmitting mechanisms which include an actuating lever pivotally mounted on the frame at a first pivot. Means are provided for coupling the actuating lever to the capsule for movement in response to the movable wall portion thereof. An indicator including a pointer arbor is journaled on the frame axially of the capsule along an arbor pivot at right angles at the first pivot. A coupling arm is pivotally mounted on the frame at a second pivot which is parallel to and spaced from the point of arbor. The coupling arm is connected to one end of a cord which is wound around the arbor, with the other end of the cord being connected to a bias spring. Provision is made for transmitting motion from the actuating lever to the coupling arm, preferably by an upstanding arm integral with the actuating lever and engaging the coupling arm.

The above brief description, as well as further objects, features and advantages of the present invention will be more fully understood by reference to the following detailed description of a presently preferred but nonetheless illustrative embodiment in accordance with the present invention, when taken in conjunction with the accompanying drawing, wherein:

FIG. 5 is a partial plan view, partly in section, similar to FIG. 3 but relating to an alternative embodiment for the spring mounting means shown in FIG. 3;

FIG. 6 is an elevational partial view of the spring of FIG. 5, showing particularly the details of the spring ends thereof;

FIGS. 7 and 8 are partial elevational views of the spring mounting means of FIG. 5, showing the position of the elements thereof before mounting and after mounting of the spring;

FIG. 9 is an elevational view of a pointer arbor useful in the present invention;

FIG. 10 is an elevational view of the pointer arbor of FIG. 9 assembled to the frame of the movement of the present invention, and showing particularly a staking means for the cord useful in the present invention;

FIG. 11 is an elevational view, partly in section, and similar to FIG. 2 but showing particularly alternative calibration means for a capsule useful in the present invention; and FIG. 12 is a bottom plane view of the capsule calibration means of FIG. 11.

Figure 1:
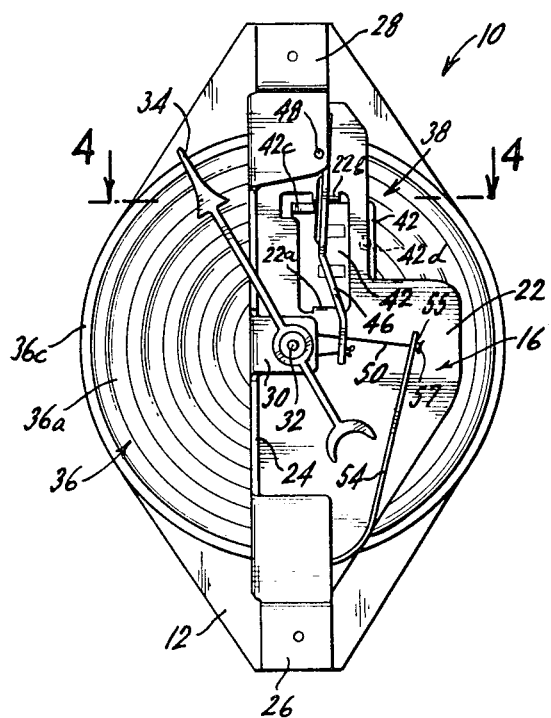
FIG. 1 is a plan view of a movement for a pressure-responsive instrument embodying features of the present invention, the outer housing and dial face being removed for the purposes of clarity in illustration.
Figure 2:
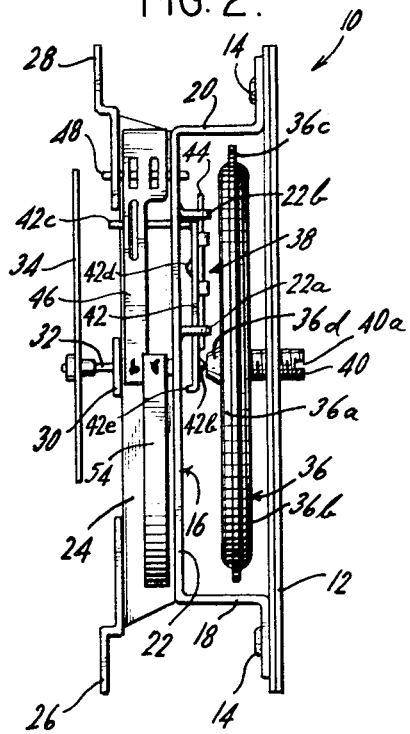
FIG. 2 is an elevational view taken from the right of FIG. 1 showing further details of the movement.

Referring now to the drawing, there is shown an instrument movement for a barometer, generally designated by the reference numeral 10, embodying features of the present invention, the movement being shown removed from the usual outer casing or housing and with the dial or face plate removed. Movement 10 includes a baseplate 12 which is of somewhat oval shape. Secured to the baseplate 12, as by rivets 14, is a stamped metal frame 16 which includes uprights 18, 20 supporting mounting plate 22 in spaced parallel relation to baseplate 12. Projecting upwardly from one side of the mounting plate 22 is an upstanding frame wall 24 which is formed contiguous to its opposite ends with mounting ears 26, 28 to which the dial plate may be attached. Extending at a central location from upstanding frame sidewall 24 is a central platform 30 on which arbor 32 carrying pointer 34 is journaled in any convenient fashion.

Figure 4:
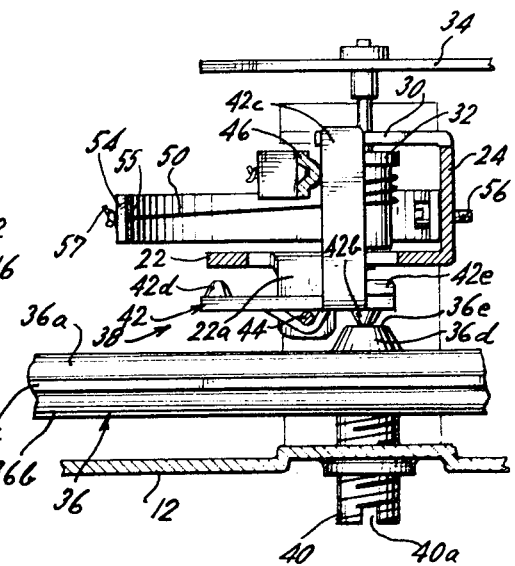
FIG. 4 is a sectional view, on an enlarged scale, taken substantially along the lines 4—4 of FIG. 1.

Disposed between the baseplate 12 and the mounting plate 22 is the usual capsule 36 which is circular and includes opposed corrugated capsule or diaphragm plates 36a, 36b welded together along their perimeter at 36c. The capsule 36 is of essentially conventional design such that a wall portion of plate 36a will move toward and away from mounting plate 22 in response to changes in the fluid pressure within capsule 36, as is generally understood. The movable wall portion 36a of capsule 36 is formed with a centrally disposed nipple 36d which has a flat top 36e (see FIG. 4) which moves into successive planes parallel to baseplate 12 in response to changes in fluid pressure and provides the sensing motion to be transmitted to pointer 34 by a motion-transmitting and amplifying mechanism, generally designated by reference numeral 38.

Capsule 36 is adjustably mounted on baseplate 12 for the purposes of calibrating the movement or mechanism 10 by the simple expedient of welding or otherwise securing to a wall portion opposite nipple 36d a threaded adjustment stud 40. Stud 40 extends axially of capsule 36 and is received within a corresponding threaded hole formed centrally of baseplate 12. The lower end of threaded adjustment stud 40 is provided with a transverse cut 40a to facilitate the insertion therein of a screwdriver blade or the like such that the flat top 36e of nipple 36d of capsule 36 may be oriented at the requisite spacing to baseplate 12 to calibrate the instrument, as is generally understood.

The motion-transmitting and amplifying mechanism 38 includes an actuating lever 42 which is journaled on the mounting plate 22 for rocking movement about a pivot which extends chordwise of capsule 36. Conveniently, mounting plate 22 may be formed with depending opposed ears 22a, 22b, which are struck out of the mounting plate and provide bearings for a pivot pin 44 for actuating lever 42. As seen best in FIG. 3, actuating lever 42 is formed with an arm 42a overlying the nipple which may be formed with a depending projection 42b (see FIG. 4) which bears against flat top 36e of capsule 36. Additionally, lever 42 is formed with an upstanding actuating arm 42c which extends through an appropriate cutout in mounting plate 22. Accordingly, as the flat top 36e of nipple 36d moves in response to expansion and contraction of capsule 36, actuating lever or member 42 will rock about pivot 44 and upstanding actuating finger 42c will move from side to side.

Extending along one side of the actuating finger 42c above mounting plate 22 is a coupling arm 46 which may take the form of a one-piece metal stamping journaled at a pivot which is parallel to and spaced from the pointer arbor. Specifically, pivot pin 48 is fixed between mounting plate 22 and frame part 28, with the pivot pin 48 being appropriately spaced from arbor pivot or shaft 32. Provision is made for connecting the coupling arm 46 to the pointer 34 and to bias the instrument and indicator mechanism. To this end, a flexible but inextensible cord 50 has several turns wrapped around arbor or pivot 32, with one end of cord 50 being connected to the coupling arm 46 contiguous to its free end and the other end of cord 50 being connected to a U-shaped spring 54 which overlies mounting plate 22 and is fixed to frame 16, for example, by screw 56 received within an appropriately tapped hole in upstanding frame wall 24.

In addition to merely wrapping cord 50 around arbor 32, an alternative embodiment to the present invention provides a cord hole (not shown) through the arbor for receiving the cord 50 and then wrapping several turns of the cord around arbor 32. As a further alternative embodiment (FIGS. 9 and 10), cord 50' is staked into arbor 32' with one or more wraps of the cord around the arbor. This further alternative embodiment is accomplished by providing a peripheral cut 60, defined by the arbor 32, inserting the cord 50' into place in the peripheral cut 60 and hitting arbor 32' with a swaging tool to form the confining bevels 60a, in order to preclude slippage of the cord relative to the arbor in an effective manner.

Furthermore, alternative to the embodiment described previously for affixing U-shaped spring 54 to upstanding frame wall 24 is an embodiment shown in FIGS. 5, 7 and 8 which features an upstanding frame wall 24' defining a ramping member 62, a stop 64 and a spring-receiving channel 66. U-shaped spring 54' is slid through spring-receiving channel 66 (FIG. 7), and over ramping member 62 to stop 64. A ramp opening 68, defined by U-shaped spring 54' thereby receives ramping member 62 to prevent decoupling motion of the U-shaped spring in a direction opposite to that represented by coupling arrow 61 (FIG. 7). U-shaped spring 54' is shown in FIGS. 5 and 8 after it has been attached to upstanding frame wall 24'.

Figure 3:
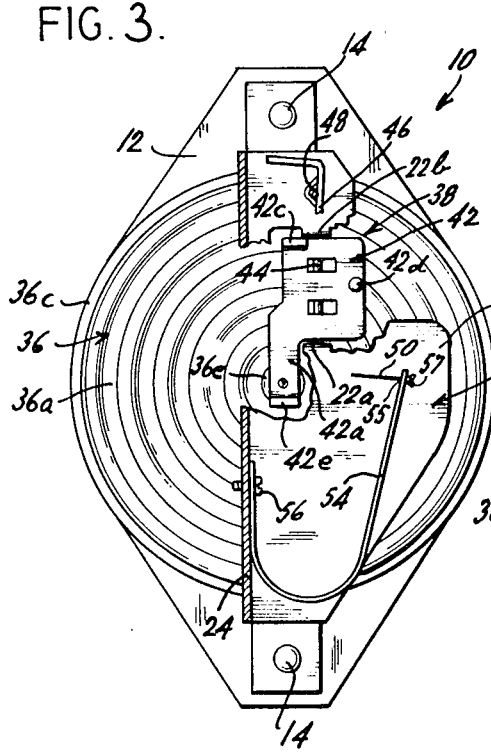
FIG. 3 is a plan view similar to FIG. 1, with parts broken away and shown in section to illustrate internal details of the movement.

It may be seen from FIGS. 1 and 3 that the cord 50 is affixed to U-shaped spring 54 by insertion of cord 50 through a cord-insertion hole 55 defined by spring 54, after which cord 50 is tied into a stop knot 57 to prevent removal thereof. Also, cord 50 is likewise affixed to coupling arm 46 after it is appropriately wrapped about and/or attached to arbor 32. An alternative attachment scheme for the cord is shown in FIGS. 5 and 6 wherein coupling arm 46' is formed with a jaw 46á, the jaw being of decreasing cross section for setting one end of cord 50' during manufacture. Likewise, the free end of U-shaped spring 54' is formed with a jaw 54á of decreasing cross section to receive and hold cord 50'. During the manufacturing process, the cord is seated at one of its ends of jaw 46á and at its other end in jaw 54á, and a quick setting glue or the like is inserted to the openings of the jaws to permanently anchor cord 50'.

A further alternative embodiment involves the mounting of a threaded capsule supporting stud 40' on a bimetal strip 70 (FIGS. 11 and 12). It is well known that pressure is affected by temperature and therefore initial and continuing calibrations of a barometric instrument should include considerations of temperature as well as other ambient conditions. The arrangement of FIGS. 11 and 12 includes bimetal strip 70 defining a central threaded opening 70a though which supporting stud 40' is inserted before its insertion centrally of baseplate 12' in oversize opening 12á defined thereby and the welding or otherwise securing of stud 40' to a wall portion of capsule 36' opposite to nipple 36d'. Bimetal strip 70 is then affixed by rivets 72 or the like to baseplate 12'. After assembly of the construction shown in FIGS. 11 and 12, continuous temperature compensation is enabled by means of the contraction and expansion of bimetal strip 70 relative to base plate 12' in response to ambient temperature change. Further selective calibration is made by use of a screwdriver and stud 40' as described previously.

In order to facilitate a more thorough understanding of the present invention, a typical sequence of operations will now be described:

Initially, the instrument is calibrated to cause the pointer 34 to be directed at the appropriate marking on the dial face, this calibration being accomplished by manual adjustment of the threaded adjustment stud. When so calibrated, pointer 34 will move in response to pressure changes as sensed by capsule 36. Furthermore, continuous calibration and temperature compensation is enabled by action of the temperature compensation structure described by reference to FIGS. 11 and 12. Subsequently, if the flat top 36e of nipple 36d moves upwardly in response to expansion of the capsule, arm 42a of actuating member 42 will move in the counterclockwise direction about pivot 44 (when viewed in FIG. 4), causing upstanding actuating finger 42c to swing to the left (when viewed in FIG. 4), with the corresponding movement of coupling arm 46 in the same direction. Motion of arm 46 is transmitted to pointer 34 via the cord or string 50 and there will be an appropriate movement of the pointer. Obviously, when the capsule contracts, there is an opposite movement of the flat top 36e of nipple 36d. The arm 42a will move in the clockwise direction swinging the actuating finger 42c to the right in FIG. 4, with coupling arm 46 following that movement due to bias of spring 54. Conveniently, the stamping used to construct actuating arm 42 may be provided with stops 42d, 42e for limiting the rocking movement of actuating member 42.

From the foregoing, it will be appreciated that there has been provided a relatively simple and correspondingly inexpensive motion-amplifying mechanism which has the requisite functionality for its intended purposes. The construction is such that it may be mass produced and calibration is simple, easy and direct.

A latitude of modification, substitution and change is intended in the foregoing disclosure. For instance, the upstanding actuating arm 42c which extends through the cutout in mounting plate 22 may be bent to the left or right to alter the amplification factor of the mechanism. The range of deflection of the pointer 34 is thereby varied to compensate for possible variations in the expansion and contraction of the instrument capsule.

What is claimed is:

1. A pressure-responsive instrument comprising a baseplate, a circular capsule mounted on said baseplate and having a wall portion movable in response to changes in fluid pressure therein, a frame mounted on said baseplate and having a mounting plate extending in a plane generally parallel to and over said wall portion of said capsule, an actuating lever, means pivotally mounting said actuating lever on said mounting plate at a first pivot pin extending parallel to the plane of said mounting plate and chordwise of said capsule, means coupling said actuating lever to said capsule for movement in response to movement of said movable wall portion, indicator means including a pointer arbor journaled on said frame perpendicular to the plane of said mounting plate, axially of said capsule and at right angles to said first pivot pin, a coupling arm, means pivotally mounting said coupling arm on said mounting plate at a second pivot pin parallel to and spaced from said pointer arbor, a cord wound around said arbor and having one end connected to said coupling arm, a common instrument and indicator bias spring operatively connected to the other end of said cord and means for transmitting motion from said actuating lever to said coupling arm.

2. An instrument according to claim 1 including means for adjusting the position of said capsule relative to said baseplate.

3. An instrument according to claim 2 wherein said means includes a threaded stud fixed to said capsule and a threaded hole on said baseplate receiving said threaded stud.

4. An instrument according to claim 1 wherein the motion-transmitting means includes an upstanding arm integral with said actuating lever and engaging said coupling arm.